United States Patent
Barger et al.

(10) Patent No.: US 11,719,246 B2
(45) Date of Patent: *Aug. 8, 2023

(54) EPICYCLIC DRIVE FOR GAS TURBINE ENGINE LUBRICANT PUMP

(71) Applicant: Raytheon Technologies Corporation, Farmington, CT (US)

(72) Inventors: David Barger, East Hartford, CT (US); Joseph H. Polly, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/172,546

(22) Filed: Feb. 10, 2021

(65) Prior Publication Data
US 2021/0190080 A1 Jun. 24, 2021

Related U.S. Application Data

(63) Continuation of application No. 15/984,792, filed on May 21, 2018, now Pat. No. 10,982,678.

(51) Int. Cl.
| | | |
|---|---|---|
| *F04D 25/02* | (2006.01) | |
| *F01D 25/20* | (2006.01) | |
| *F02C 7/06* | (2006.01) | |
| *F02C 7/32* | (2006.01) | |
| *F16H 57/04* | (2010.01) | |

(52) U.S. Cl.
CPC .......... *F04D 25/028* (2013.01); *F01D 25/20* (2013.01); *F02C 7/06* (2013.01); *F02C 7/32* (2013.01); *F16H 57/0436* (2013.01); *F05D 2260/40311* (2013.01); *F05D 2260/98* (2013.01)

(58) Field of Classification Search
None
See application file for complete search history.

(56) References Cited

U.S. PATENT DOCUMENTS

| | | |
|---|---|---|
| 8,205,432 B2 | 6/2012 | Sheridan |
| 8,230,974 B2 | 7/2012 | Parnin |
| 8,702,373 B1 | 4/2014 | Valva et al. |
| 2013/0319006 A1 | 12/2013 | Parnin et al. |
| 2014/0093356 A1* | 4/2014 | Stutz ...................... F01D 25/18 415/121.3 |
| 2015/0361886 A1 | 12/2015 | Roberge |
| 2015/0369128 A1 | 12/2015 | Parnin et al. |

(Continued)

FOREIGN PATENT DOCUMENTS

| | | |
|---|---|---|
| EP | 3171055 A1 | 5/2017 |
| WO | 2008/044792 A1 | 4/2008 |

OTHER PUBLICATIONS

European Search Report for EP Application No. 19175737.6 dated Oct. 18, 2019.

*Primary Examiner* — Kayla Mccaffrey
(74) *Attorney, Agent, or Firm* — Carlson, Gaskey & Olds, P.C.

(57) ABSTRACT

A gas turbine engine includes a fan drive turbine driving a fan rotor through a main gear reduction. A primary lubricant system supplies lubricant to the main gear reduction. An auxiliary oil pump supplies oil to the main gear reduction. An auxiliary pump epicyclic gear train drives the auxiliary pump when the fan rotor is rotating in either direction. The main gear reduction is separate from the auxiliary pump epicyclic gear train.

19 Claims, 2 Drawing Sheets

(56) References Cited

U.S. PATENT DOCUMENTS

| | | |
|---|---|---|
| 2015/0377066 A1 | 12/2015 | Duong et al. |
| 2016/0032773 A1 | 2/2016 | James et al. |
| 2016/0222975 A1 | 8/2016 | Sheridan et al. |
| 2016/0376988 A1 | 12/2016 | Sheridan |
| 2017/0002738 A1 | 1/2017 | Sheridan |
| 2017/0122330 A1 | 5/2017 | Mastro et al. |

* cited by examiner

EPICYCLIC DRIVE FOR GAS TURBINE ENGINE LUBRICANT PUMP

CROSS-REFERENCE TO RELATED APPLICATIONS

This application is a continuation of U.S. patent application Ser. No. 15/984,792 filed on May 21, 2018, now U.S. Pat. No. 10,982,678 granted on Apr. 20, 2021.

BACKGROUND

This application relates to a drive train for an auxiliary pump for use in a gas turbine engine that includes an epicyclic gear train.

Gas turbine engines are known and typically include a fan delivering air into a bypass duct as propulsion air and into a compressor. The air in the compressor is compressed and delivered into a combustor where it is mixed with fuel and ignited. Products of this combustion pass downstream over turbine rotors driving them to rotate.

Historically, a turbine rotor drove the fan rotor through a direct connection and at a common speed. More recently, it has been proposed to utilize a gear reduction between the turbine and the fan rotor. This results in several efficiencies.

However, it is also important to provide adequate lubrication to the gear reduction. Thus, a primary lubricant system is provided that will supply lubricant to the gear reduction and other engine components during operation of the engine. However, it is also important to recognize that the primary lubricant system could fail.

In addition, there are times when the engine may not be powered, but there may still be rotation into the engine. One example is windmilling operation. Windmilling operation can occur when an associated aircraft is on the ground and wind speeds pass across the fan blades driving them to rotate. Another time when windmilling can occur is when the associated aircraft is in the air, but the engine in question is not being driven. The air passing across the engine can cause the fan rotor to rotate.

Windmilling can occur in either direction. It is important to provide the lubricant at all times, and thus an auxiliary pump has been provided.

In the prior art, a gear train for driving the auxiliary pump has typically been provided with several circumferentially spaced gears, such that a good deal of circumferential space is required.

SUMMARY

In a featured embodiment, a gas turbine engine includes a fan drive turbine driving a fan rotor through a main gear reduction. A primary lubricant system supplies lubricant to the main gear reduction. An auxiliary oil pump supplies oil to the main gear reduction. An auxiliary pump epicyclic gear train drives the auxiliary pump when the fan rotor is rotating in either direction. The main gear reduction is separate from the auxiliary pump epicyclic gear train.

In another embodiment according to the previous embodiment, an input gear rotates when the fan rotor rotates, and in a direction of rotation of the fan rotor and engages a ring gear in the auxiliary pump epicyclic gear train. The ring gear has an outer peripheral envelope and an axis of rotation of the auxiliary pump is within the outer peripheral envelope.

In another embodiment according to any of the previous embodiments, the ring gear includes a first ring gear portion selectively driving a second ring gear portion through a first clutch, and the first ring gear portion driving an output shaft which is engaged to drive the auxiliary pump through a second clutch. One of the first and second clutches is operable to transmit rotation when driven in a first direction of rotation, but does not transmit rotation when driven in a second direction of rotation, and the other of said first and second clutches is operable to transmit rotation when driven in the second direction of rotation, but not transmit rotation when driven in said first direction of rotation.

In another embodiment according to any of the previous embodiments, when the first ring gear portion drives the second ring gear portion. The second ring gear portion drives a plurality of intermediate gears to, in turn, drive a sun gear, with the sun gear rotating the output shaft.

In another embodiment according to any of the previous embodiments, the output shaft drives an output gear, which is, in turn, engaged with an auxiliary pump drive gear to drive the auxiliary pump.

In another embodiment according to any of the previous embodiments, the first and second clutches are sprag clutches.

In another embodiment according to any of the previous embodiments, the main gear reduction is also an epicyclic gear train.

In another embodiment according to any of the previous embodiments, the intermediate gears are supported in a fixed carrier.

In another embodiment according to any of the previous embodiments, the output shaft drives an output gear, which is, in turn, engaged with an auxiliary pump drive gear to drive the auxiliary pump.

In another embodiment according to any of the previous embodiments, the first and second clutches are sprag clutches.

In another embodiment according to any of the previous embodiments, the main gear reduction is also an epicyclic gear train.

In another embodiment according to any of the previous embodiments, the first and second clutches are sprag clutches.

In another embodiment according to any of the previous embodiments, the main gear reduction is also an epicyclic gear train.

In another embodiment according to any of the previous embodiments, the output shaft rotates on an output shaft axis. The auxiliary pump rotates on an auxiliary pump axis, and the input gear rotes about an input gear axis, and the input gear axis is on an opposed side of the output shaft axis relative to the auxiliary pump axis.

In another embodiment according to any of the previous embodiments, an output shaft drives an output gear, which is, in turn, engaged with an auxiliary pump drive gear to drive the auxiliary pump.

In another embodiment according to any of the previous embodiments, the first and second clutches are sprag clutches.

In another embodiment according to any of the previous embodiments, the main gear reduction is also an epicyclic gear train.

In another embodiment according to any of the previous embodiments, the main gear reduction is also an epicyclic gear train.

In another embodiment according to any of the previous embodiments, the main gear reduction is also an epicyclic gear train.

In another embodiment according to any of the previous embodiments, an output shaft drives an output gear, which is, in turn, engaged with an auxiliary pump drive gear to drive said auxiliary pump.

These and other features may be best understood from the following drawings and specification.

DETAILED DESCRIPTION

Figure 1:
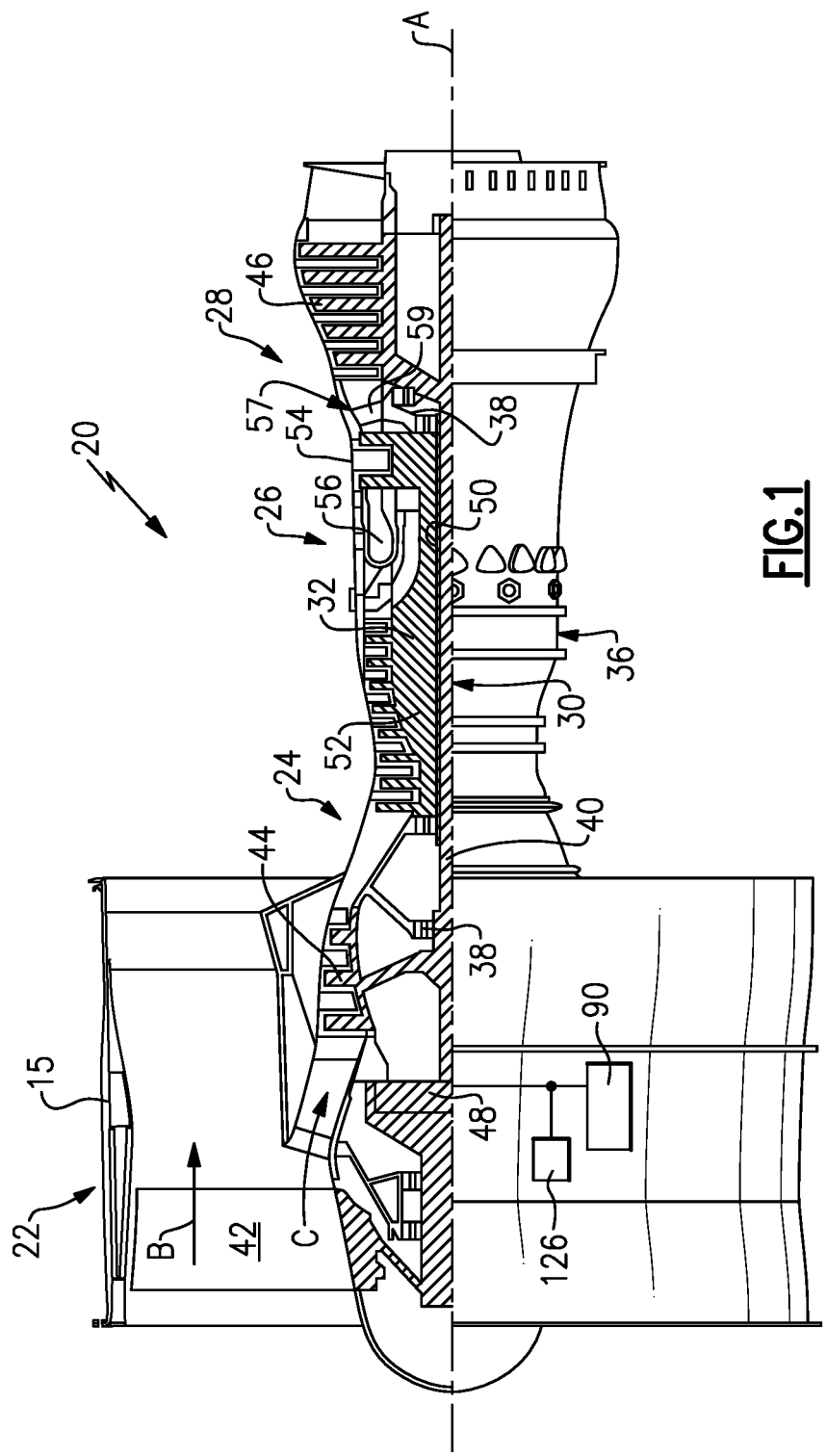
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system, star gear system, or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system, star gear system, or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

A primary lubricant system and pump 90 is shown. An auxiliary oil pump 126 is also shown. Both are shown schematically.

Figure 2:
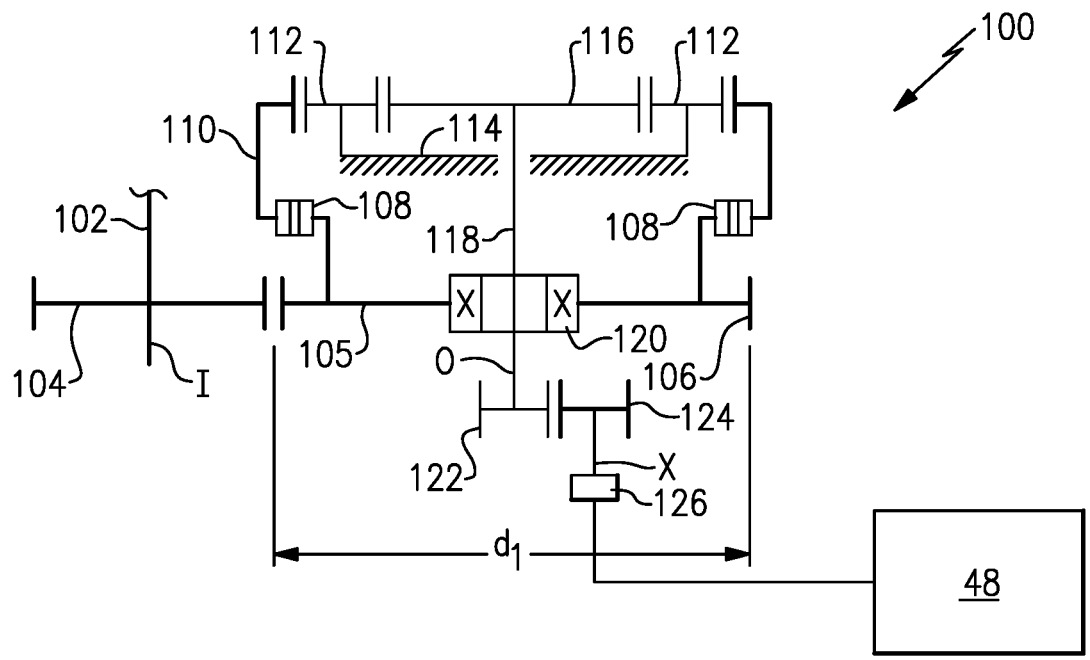
FIG. 2 shows a gear train for an auxiliary lubricant pump.

FIG. 2 shows a gear train for driving an auxiliary lubricant pump 126 to supply lubricant to the gear reduction 48 at least when the primary lubricant system 90 is not operating.

In FIG. 2, a gear 104 rotates with a shaft 102 rotates when the fan rotor rotates. The gear 104 engages a gear 105 having gear teeth 106 defining an outer peripheral surface. The gear teeth 106 define an outer peripheral envelope dl. The gear 105 is essentially a portion of a ring gear associated with the gear train 100. Gear 105 rotates a clutch 108 which can selectively drive a second ring gear portion 110.

In the FIG. 2 mode, the clutch 108 is shown schematically as being open. That is, the first ring gear portion 105 does not drive the second ring gear portion 110. This may occur when the rotation of the fan is in a forward direction or the normal operational direction for drive of the engine.

The ring gear portion 110 is shown engaged with a plurality of intermediate gears 112 and associated with a fixed carrier 114, which mounts the gears 112. The gears 112 will drive a sun gear 116 and its shaft 118. Shaft 118 passes through a clutch 120 to drive a gear 122 which is, in turn, connected to drive a gear 124, which drives the auxiliary pump 126.

The clutches 108 and 120 may be sprag clutches, or any other type of one-way clutch. Any clutch that can survive the jet engine environment may be considered. One example may be a centrifugal clutch. As known, when driven in a first direction, such clutches will slip and not transmit rotation. However, when driven in the opposed rotational direction, the sprag members will engage in rotation and will be transmitted. The direction of rotation for slipping/transmitting drive between the clutches 108 and 120 is reversed.

In the FIG. 2 mode, drive from gear 104 drives ring gear portion 105. Clutch 120 is engaged in this direction such that rotation of the gear 105 drives the shaft 118. On the other hand, the sprag members in clutch 108 slip such that the ring gear portion 105 does not drive the ring gear portion 110.

Figure 3:
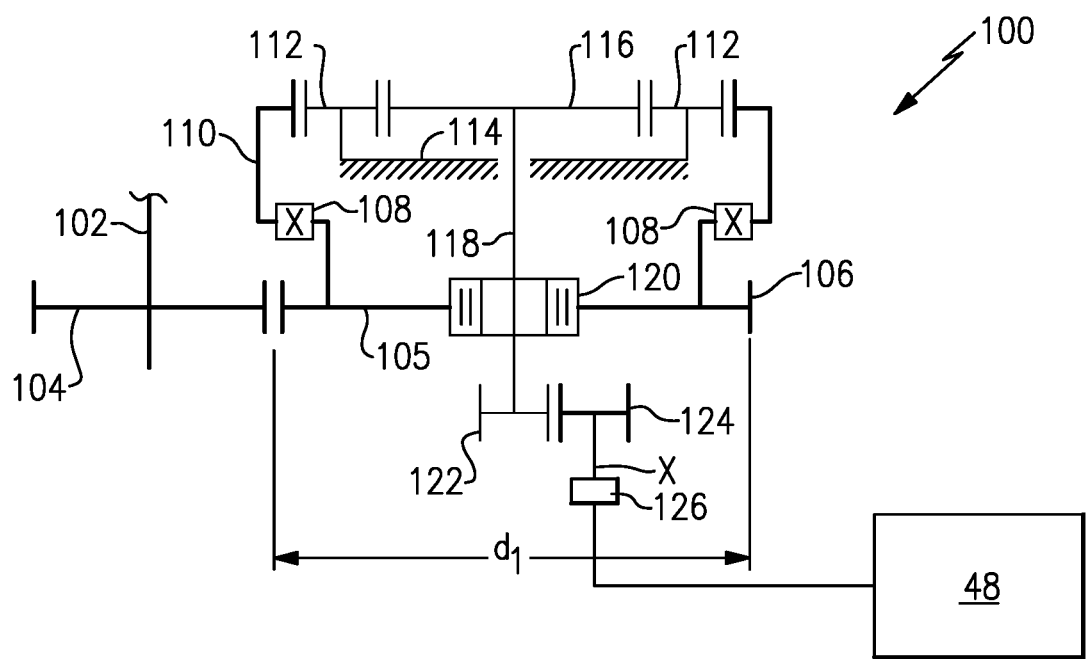
FIG. 3 shows the FIG. 2 gear train in an alternative mode of operation.

FIG. 3 shows the opposed direction of rotation, such as when the fan drives the gear 104 in a reverse direction opposed to the normal direction. As shown, the clutch 120 is now open such that drive is not transmitted between the ring gear portion 105 and the shaft 118. Instead, the clutch 108 is engaged, and ring gear portion 105 drives ring gear portion 110. This drives the intermediate gears 112 to, in turn, drive the sun gear 116. In this way, the shaft 118 is rotated such that the gear 122 is again rotated. The gear 124 is, thus, rotated driving the auxiliary pump 126.

In this embodiment, since the gear 124 and a pump drive axis X, are within the outer peripheral envelope di of the ring gear portion 105, less circumferential space is required for the overall arrangement. Also, input gear 102 is shown rotating on an axis I, that is on an opposed side of an output shaft axis O relative to an auxiliary pump axis X.

While a fixed carrier is disclosed, an epicyclic gear system with a fixed ring gear, or no fixed portion may also be used. In such arrangements the location of the clutches may be changed.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a fan drive turbine driving a fan rotor through an epicyclic main gear reduction;
   a primary lubricant system for supplying lubricant to said main gear reduction, and an auxiliary oil pump for supplying oil to said main gear reduction, and an auxiliary pump epicyclic gear train for driving said auxiliary pump when said fan rotor is rotating in either direction, said main gear reduction being separate from said auxiliary pump epicyclic gear train, said auxiliary pump epicyclic gear train including a ring gear engaged with a plurality of intermediate gears, and said plurality of intermediate gears engaged with a sun gear; and
   said fan rotor being received within an outer housing, with a bypass duct being defined between said outer housing and a core housing which houses said fan drive turbine, and said fan rotor delivering air into said bypass duct as propulsion air and into said core housing, and a bypass ratio being defined as a volume of air delivered into said bypass duct divided by a volume of air delivered into said core housing, said bypass ratio being greater than 10.0, a gear ratio of said main gear reduction being greater than 2.3, and a pressure ratio measured prior to an inlet of said fan drive turbine as related to the pressure at an outlet of said fan drive turbine prior to any exhaust nozzle is greater than 5.0.

2. The gas turbine engine as set forth in claim 1, wherein a low fan pressure ratio across a fan blade alone is less than 1.45 and a low corrected fan tip speed, which is an actual fan tip speed of said fan blade in feet per second divided by an industry standard temperature correction of $[(Tram\ °\ R)/(518.7°\ R)]^{0.5}$, being less than about 1150 ft/seconds, with both said low corrected fan tip speed and said low fan pressure ratio being measured at a cruise condition at 0.8 Mach, and 35,000 feet.

3. The gas turbine engine as set forth in claim 2, wherein an input gear rotates when said fan rotor rotates, and in a direction of rotation of said fan rotor and engages said ring gear in said auxiliary pump epicyclic gear train, said ring gear having an outer peripheral envelope and an axis of rotation of said auxiliary pump is within said outer peripheral envelope.

4. The gas turbine engine as set forth in claim 3, wherein said ring gear includes a first ring gear portion selectively driving a second ring gear portion through a first clutch, and said first ring gear portion driving an output shaft which is engaged to drive said auxiliary pump through a second clutch, wherein one of said first and second clutches is operable to transmit rotation when driven in a first direction of rotation, but does not transmit rotation when driven in a second direction of rotation, and the other of said first and second clutches is operable to transmit rotation when driven in said second direction of rotation, but not transmit rotation when driven in said first direction of rotation, and when said first ring gear portion drives said second ring gear portion, said second ring gear portion drives said plurality of intermediate gears to, in turn, drive said sun gear, with said sun gear rotating said output shaft.

5. The gas turbine engine as set forth in claim 4, wherein said output shaft rotates on an output shaft axis, said auxiliary pump rotating on an auxiliary pump axis, and said input gear rotating about an input gear axis, and said input gear axis being on an opposed side of said output shaft axis relative to said auxiliary pump axis.

6. The gas turbine engine as set forth in claim 5, wherein said first and second clutches are sprag clutches.

7. The gas turbine engine as set forth in claim 2, wherein said ring gear includes a first ring gear portion selectively driving a second ring gear portion through a first clutch, and said first ring gear portion driving an output shaft which is engaged to drive said auxiliary pump through a second clutch, wherein one of said first and second clutches is operable to transmit rotation when driven in a first direction of rotation, but does not transmit rotation when driven in a second direction of rotation, and the other of said first and second clutches is operable to transmit rotation when driven in said second direction of rotation, but not transmit rotation when driven in said first direction of rotation, and when said first ring gear portion drives said second ring gear portion, said second ring gear portion drives said plurality of intermediate gears to, in turn, drive said sun gear, with said sun gear rotating said output shaft.

8. A gas turbine engine comprising:
   a fan drive turbine driving a fan rotor through an epicyclic main gear reduction;

a primary lubricant system for supplying lubricant to said main gear reduction, and an auxiliary oil pump for supplying oil to said main gear reduction, and an auxiliary pump epicyclic gear train for driving said auxiliary pump when said fan rotor is rotating in either direction, said main gear reduction being separate from said auxiliary pump epicyclic gear train, said auxiliary pump epicyclic gear train including a ring gear engaged with a plurality of intermediate gears, and said plurality of intermediate gears engaged with a sun gear; and said fan rotor being received within an outer housing, with a bypass duct being defined between said outer housing and a core housing which houses said fan drive turbine, and said fan rotor delivering air into said bypass duct as propulsion air and into said core housing, and a bypass ratio being defined as a volume of air delivered into said bypass duct divided by a volume of air delivered into said core housing, said bypass ratio being greater than 10.0; and a low fan pressure ratio across a fan blade alone is less than 1.45 and a low corrected fan tip speed, which is an actual fan tip speed of said fan blade in feet per second divided by an industry standard temperature correction of $[(\text{Tram }° \text{R})/(518.7° \text{R})]^{0.5}$, being less than about 1150 ft/seconds, with both said low corrected fan tip speed and said low fan pressure ratio being measured at a cruise condition at 0.8 Mach, and 35,000 feet.

9. The gas turbine engine as set forth in claim 8, wherein an input gear rotates when said fan rotor rotates, and in a direction of rotation of said fan rotor and engages said ring gear in said auxiliary pump epicyclic gear train, said ring gear having an outer peripheral envelope and an axis of rotation of said auxiliary pump is within said outer peripheral envelope.

10. The gas turbine engine as set forth in claim 9, wherein said ring gear includes a first ring gear portion selectively driving a second ring gear portion through a first clutch, and said first ring gear portion driving an output shaft which is engaged to drive said auxiliary pump through a second clutch, wherein one of said first and second clutches is operable to transmit rotation when driven in a first direction of rotation, but does not transmit rotation when driven in a second direction of rotation, and the other of said first and second clutches is operable to transmit rotation when driven in said second direction of rotation, but not transmit rotation when driven in said first direction of rotation, and when said first ring gear portion drives said second ring gear portion, said second ring gear portion drives said plurality of intermediate gears to, in turn, drive said sun gear, with said sun gear rotating said output shaft.

11. The gas turbine engine as set forth in claim 10, wherein said output shaft rotates on an output shaft axis, said auxiliary pump rotating on an auxiliary pump axis, and said input gear rotating about an input gear axis, and said input gear axis being on an opposed side of said output shaft axis relative to said auxiliary pump axis.

12. The gas turbine engine as set forth in claim 11, wherein said first and second clutches are sprag clutches.

13. The gas turbine engine as set forth in claim 8, wherein said ring gear includes a first ring gear portion selectively driving a second ring gear portion through a first clutch, and said first ring gear portion driving an output shaft which is engaged to drive said auxiliary pump through a second clutch, wherein one of said first and second clutches is operable to transmit rotation when driven in a first direction of rotation, but does not transmit rotation when driven in a second direction of rotation, and the other of said first and second clutches is operable to transmit rotation when driven in said second direction of rotation, but not transmit rotation when driven in said first direction of rotation, and when said first ring gear portion drives said second ring gear portion, said second ring gear portion drives said plurality of intermediate gears to, in turn, drive said sun gear, with said sun gear rotating said output shaft.

14. A gas turbine engine comprising:

a fan drive turbine driving a fan rotor through a main gear reduction; and a primary lubricant system for supplying lubricant to said main gear reduction, and an auxiliary oil pump for supplying oil to said main gear reduction, and an auxiliary pump gear train for driving said auxiliary pump when said fan rotor is rotating in either direction, said main gear reduction being separate from said auxiliary pump gear train; and an input gear to rotate when said fan rotor rotates, and in a direction of rotation of said fan rotor and engages a first gear in said auxiliary pump gear train, said first gear having an outer peripheral envelope, wherein in either direction of rotation of the fan rotor, said first gear rotates a drive gear, said drive gear driving an auxiliary pump gear that rotates on an axis of rotation of the auxiliary pump, and said auxiliary pump gear being within said outer peripheral envelope.

15. The gas turbine engine as set forth in claim 14, wherein said first gear includes a main first gear portion selectively driving a second main gear portion through a first clutch, and said main gear portion driving an output shaft which is engaged to drive said auxiliary pump through a second clutch, wherein one of said first and second clutches is operable to transmit rotation when driven in a first direction of rotation, but does not transmit rotation when driven in a second direction of rotation, and the other of said first and second clutches is operable to transmit rotation when driven in said second direction of rotation, but not transmit rotation when driven in said first direction of rotation.

16. The gas turbine engine as set forth in claim 15, wherein said output shaft driving an output gear, which is, in turn, engaged with an auxiliary pump drive gear to drive said auxiliary pump.

17. The gas turbine engine as set forth in claim 16, wherein said first and second clutches are sprag clutches.

18. The gas turbine engine as set forth in claim 16, wherein said output shaft rotates on an output shaft axis, said auxiliary pump rotating on an auxiliary pump axis, and said input gear rotating about an input gear axis, and said input gear axis being on an opposed side of said output shaft axis relative to said auxiliary pump axis.

19. The gas turbine engine as set forth in claim 14, wherein said auxiliary pump gear train is an epicyclic gear train.

* * * * *